United States Patent
Marino et al.

(10) Patent No.: US 8,088,241 B2
(45) Date of Patent: Jan. 3, 2012

(54) APPLIQUE PRINTING PROCESS AND MACHINE

(75) Inventors: Robert Marino, Louisville, KY (US); Christopher Allen Freeman, Louisville, KY (US)

(73) Assignee: CAFEPRESS.COM, San Mateo, CA (US)

( * ) Notice: Subject to any disclaimer, the term of this patent is extended or adjusted under 35 U.S.C. 154(b) by 86 days.

(21) Appl. No.: 12/477,758

(22) Filed: Jun. 3, 2009

(65) Prior Publication Data

US 2009/0294045 A1    Dec. 3, 2009

Related U.S. Application Data

(60) Provisional application No. 61/058,530, filed on Jun. 3, 2008.

(51) Int. Cl.
*B32B 37/02*    (2006.01)
*B32B 38/04*    (2006.01)

(52) U.S. Cl. ........ 156/253; 156/257; 156/268; 156/248; 156/277; 156/83; 156/308.2

(58) Field of Classification Search .............. 156/257, 156/268, 277, 248, 83, 308.2, 253
See application file for complete search history.

(56) References Cited

U.S. PATENT DOCUMENTS

| | | | | |
|---|---|---|---|---|
| 3,783,156 A | * | 1/1974 | Kuroda | 264/512 |
| 2006/0048691 A1 | * | 3/2006 | Brier, Jr. | 112/475.19 |
| 2006/0108060 A1 | * | 5/2006 | Benjamin-Shaw | 156/256 |

* cited by examiner

*Primary Examiner* — Linda L Gray
(74) *Attorney, Agent, or Firm* — David H. Jaffer; Pillsbury Winthrop Shaw Pittman LLP

(57) ABSTRACT

A method and apparatus for creating a design that is melded onto an underlying layer of material that is then cut out and applied onto a final surface to produce an appliqué. The design is first created using a printer to print a design onto a top layer of "puff" or other suitable cloth material. The printed design area is cut out of the top layer material and then the bottom layer, to create a two layer appliqué that resembles a traditional stitched appliqué.

20 Claims, 2 Drawing Sheets

US 8,088,241 B2

APPLIQUE PRINTING PROCESS AND MACHINE

CROSS-REFERENCE TO RELATED APPLICATION

This application claims priority from U.S. Provisional Patent Application Ser. No. 61/058,530 filed on Jun. 3, 2008.

FIELD OF THE INVENTION

The present invention relates generally to methods of producing customized designs resembling appliqués created with traditional needlework techniques, and more particularly to a method of creating a design that is melded onto an underlying border material for adhering to a final surface such as a garment.

SUMMARY OF THE INVENTION

The present invention includes a method and apparatus for creating a design that is melded onto an underlying layer of material that is then cut out and applied onto a final surface to produce an appliqué. The design is first created by using a printer to print a design onto a top layer of "puff" or other suitable cloth material. The apparatus can adhere the top layer onto a bottom layer material, such as felt or other cloth backing material, using hot glue or other adhering means. The design on the top layer and/or the border created by the bottom layer material can be embellished with a line of printed or cut stitches. The printed design area is first cut out of the top layer material and then the bottom layer respectively, to create a two layer appliqué consisting of the design on the top layer with an underlying border of material on the bottom layer. The appliqué can be heat pressed onto a final surface such as a garment, and resembles an appliqué created and stitched with traditional or labor-intensive needlework techniques.

In a preferred embodiment, the printed material is fed from a printer into an automated apparatus that deposits hot glue laminate onto a bottom layer of felt or other cloth backing material on a conveyor belt and then uses a roller to press and meld the two layers together. A laser may be used to cut a particular printed design, including any hollow areas within the design, out of the top layer material. The laser may also burn a dotted line into the bottom layer, just outside the outer edge of the design area on the top layer, so that the design appears to be surrounded by a line of stitching on the bottom layer material.

The two layer appliqué, consisting of a design on the top layer appearing as if stitched onto an underlying border created by the bottom layer, is then cut out of the waste portions of the bottom layer material using a laser. Next, hot glue laminate is applied to the bottom side of the appliqué, which is then heat pressed onto a final surface such as a garment that has been placed onto a platen on the conveyor belt of the apparatus. If "puff" material is used for the top layer, the heat and pressure applied to the appliqué causes the puff material to expand and provide a three-dimensional raised or puff effect. The printed appliqué as adhered onto the final surface resembles one created and stitched with traditional or labor-intensive needlework appliqué techniques.

IN THE DRAWING

DETAILED DESCRIPTION

The process of the present invention is particularly suited to creation of single or low unit batches of a design. Instead of creating a large number of design units that must be held in stock, this process enables on-demand printing to allow a customer to create a small number of units in a efficient manner without expending the time and labor required for traditional needlework appliqué techniques. A design is simply printed onto fabric, adhered to cloth backing, cut as desired, and attached to a garment or other product.

Figure 1:
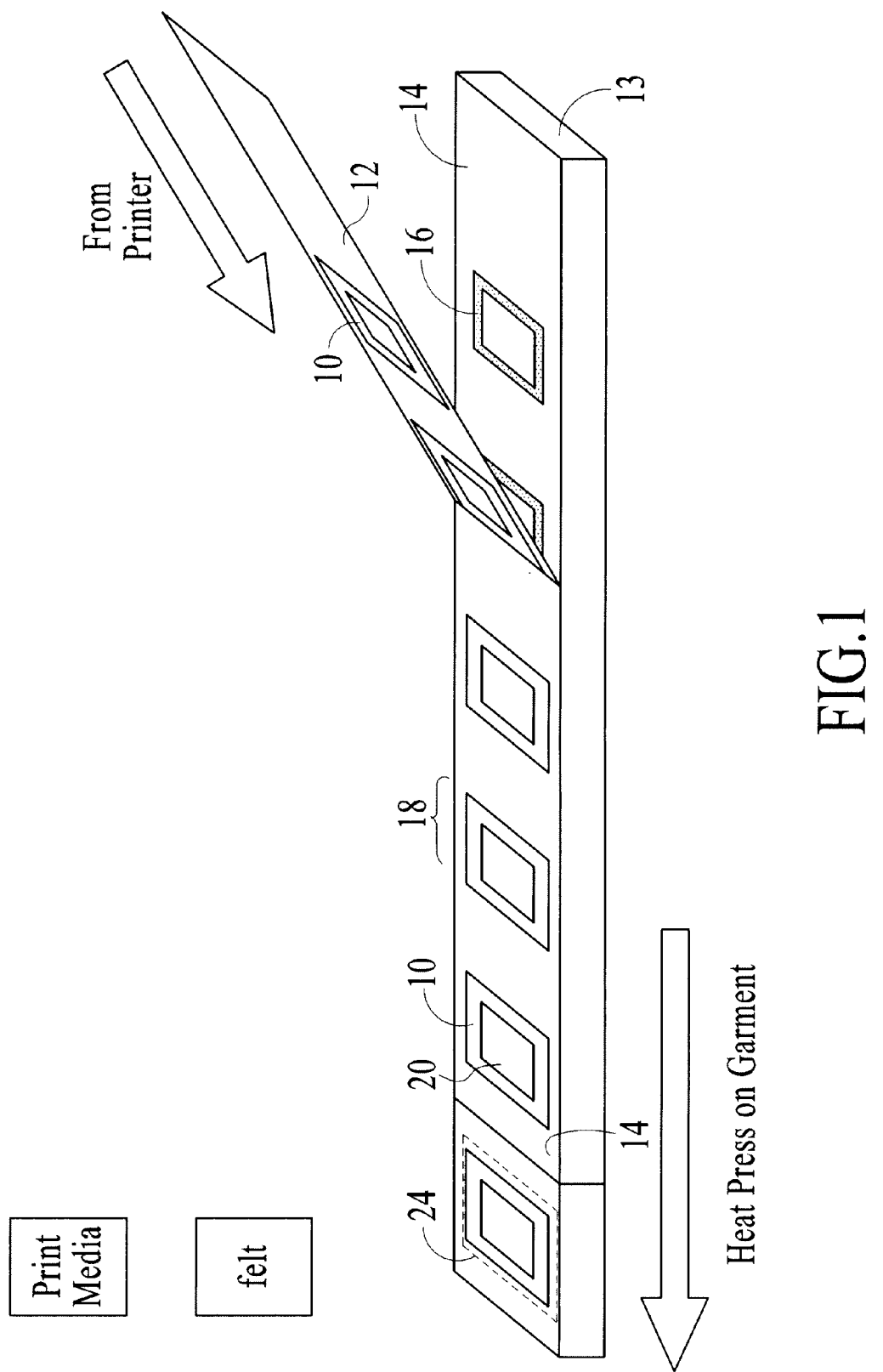
FIG. 1 is a perspective view of an appliqué being formed according to the present invention.

FIG. 1 shows a layer of material such as heat activated puff material 12 fed from an automated printer that has printed a particular design 10 onto the material 12. The design can be any shape and any printable color or mixture of colors. A lines of stitches can be printed just inside the outer border of the design, to give the appearance of hand-stitching as in an appliqué.

A particular design 10 is printed, using information submitted to the printer by a customized software application that places and processes orders, onto the top layer of puff or other cloth material 12. A dotted line resembling stitches may be then printed onto the design, inside the outer edge of the particular printed design, giving the appearance that the puff or top layer design is attached to the bottom layer with hand or machine stitching. The design 10 shown in FIG. 1 is simply a hollow rectangle. In practice, the printed design would generally be more intricate, possibly having a plurality of discrete and separate shapes such as symbols or letters in different fonts as well as a wide range of colors capable of being printed with the printer.

The material is fed into the appliqué making apparatus shown in FIG. 1. On the conveyor belt of the apparatus 13, a bottom layer of felt or other cloth backing material 14 serves as the underlying layer and border of the appliqué, onto which the layer of "puff" or other cloth material 12 is melded. Suitable materials 12 include heat activated "puff" material that expands upon application of heat and pressure to give a three-dimensional raised or puff effect. It can, for example, be a heat activated appliqué on pressure sensitive release paper such as disclosed in U.S. Pat. No. 5,665,458. Other suitable materials include any cloth backing material.

To form the appliqué, hot glue laminate 16 is deposited onto the bottom layer of material with a digital glue dispenser having an array of heads in the shape of the particular design shown in 10. Then, a roller (not shown) melds the top layer of puff or other material 12 onto the underlying layer of felt or other cloth material 14 as shown in 18.

Next, the printed design 10, including both the design's outer edges and any inner edges surrounding any hollow spaces 20 within the design, is cut out of the top layer material 12 using a laser that leaves the bottom layer 14 intact. Although at this point the top layer 12 has been melded onto the underlying bottom layer 14, the laser is able to cut into only the top and not the bottom layer. If desired, the laser also burns a dotted line of holes 24 into the bottom layer outside the outer edges of the design, giving the appearance of a line of stitching on the border of the material underlying the top layer.

The two layer design is then cut out of the waste portions of the bottom layer material with a laser, such that the resulting appliqué consists of a printed design (i.e. top layer) melded onto an underlying felt or other material border (i.e. bottom layer). Scraps or waste material resulting from the cutting of the top layer 12 and/or the bottom layer 14 are removed by blowing compressed air onto the design area (or by other suitable extracting methods such as gravity or mechanical picking methods). The appliqué is then ready to be applied to a final surface using a heat press. The final surface may be a cloth substrate or garment or similar surfaces as found on another product such as a baseball cap, a jacket, a backpack, a pillow, a bag or other surfaces that will be apparent to those skilled in the art.

To heat press the printed appliqué onto a final surface, the final surface is placed onto a platen that is suitable for that final surface. The platen is then placed back onto the conveyor belt of the apparatus in FIG. 1. Finally, hot glue laminate is applied to the back side of the bottom layer of the appliqué and the appliqué is then heat pressed onto the final surface. If "puff" material is used for the top layer, the heat and pressure applied to the appliqué by the press causes the puff material to expand, giving the appliqué a three-dimensional raised or puff effect.

Figure 2:
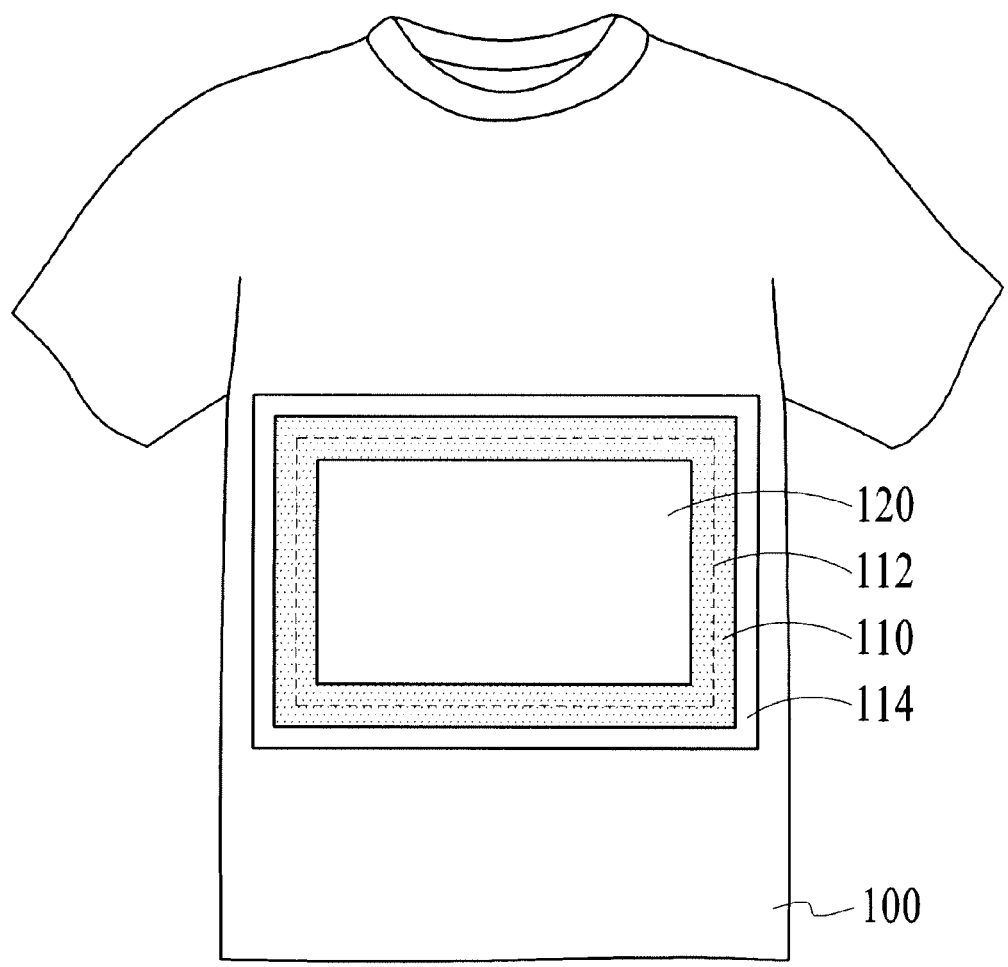
FIG. 2 shows the completed appliqué of the present invention as applied onto a final surface such as a T-shirt.

FIG. 2 shows the two layer appliqué applied onto a T-shirt 100 as a final surface. The design 110 from a top layer of material shown with printed stitches 112 is applied with hollow area 120 shown underlying bottom layer 114. Thus, bottom layer 114 shows through in hollow area 120.

A preferred embodiment includes first printing a particular design onto a top layer of "puff" or other material that is fed onto an appliqué making apparatus, then melding the top layer with hot glue onto an underlying layer of felt or other material, optionally printing a dotted line onto the design area inside its outer edges to resemble stitching, and cutting the printed design area to separate the design from the waste portions of top layer material. A dotted line may also be burned into the bottom layer, just outside the outer border of the design area on the top layer. Next, the two layer appliqué, including the top layer of puff or other material and the bottom layer of felt or other material melded together, is cut out of the waste portions of the bottom layer with a laser. Compressed air is blown onto the appliqué area to remove any scraps or waste material. To adhere the appliqué onto a final surface, the final surface is placed onto a platen on the conveyor belt of the apparatus. Glue laminate is applied to the bottom side of the appliqué. The appliqué is then heat pressed onto the final surface. If puff material is used for the top layer, the heat press will cause the puff layer to expand and provide a three-dimensional raised or puff effect.

The invention as described provides a method of creating appliqués with an automated process that produces appliqués that appear as if they were created with and adhered onto a final surface using traditional needlework appliqué techniques. The process is fast, inexpensive, and uniquely suited to the manufacture of smaller quantities of a particular appliqué design.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. An automated process for creating a printed design resembling a needlework appliqué, comprising the steps of:
   (a) printing a design onto a first layer of material;
   (b) attaching the first layer of material to a second layer of material;
   (c) cutting a portion of the first layer of material with a laser cutter to reveal at least a part of the second layer of material;
   (d) cutting a border of holes in the second layer of material with a laser cutter outside an outer edge of the first layer of material to give the appearance of stitching on the border of the second layer of material;
   (e) cutting the second layer of material to separate the design and a portion of the second layer of material into an appliqué;
   (f) removing waste portions of the first material and second material using an extraction method; and
   (g) adhering the appliqué to a cloth substrate.

2. The method of claim 1, wherein the extraction method is selected from the group consisting of blowing a compressed gas, mechanical picking, and gravity.

3. The method of claim 1, wherein a dotted line is printed onto the first layer of material to resemble stitching.

4. The method of claim 1, wherein a portion of the first layer of material is cut to resemble stitching.

5. The method of claim 1 wherein the first layer of material is heat activated puff material.

6. The method of claim 5, wherein the extraction method is selected from the group consisting of blowing a compressed gas, mechanical picking, and gravity.

7. The method of claim 5, wherein a dotted line is printed onto the first layer of material to resemble stitching.

8. The method of claim 5, wherein a portion of the first layer of material is cut to resemble stitching.

9. The method of claim 5, further comprising the step of: heating the appliqué to cause the puff material to expand.

10. An on-demand automated process for creating a printed design resembling a needlework appliqué, comprising the steps of:
    (a) receiving a design designated by a customer;
    (b) formatting the design for computerized printing;
    (c) directing with a computer the printing of the design onto a first layer of material;
    (d) attaching the first layer of material to a second layer of material;
    (e) cutting a portion of the first layer of material with a laser cutter to reveal at least a part of the second layer of material;
    (f) cutting a border of holes in the second layer of material with a laser cutter outside an outer edge of the first layer of material to give the appearance of stitching on the border of the second layer of material;
    (g) cutting the second layer of material to separate the design and a portion of the second layer of material into an appliqué;
    (h) removing waste portions of the first material and second material using an extraction method; and
    (i) adhering the appliqué to a cloth substrate.

11. The method of claim 10, wherein the extraction method is selected from the group consisting of blowing a compressed gas, mechanical picking, and gravity.

12. The method of claim 10, wherein a dotted line is printed onto the first layer of material to resemble stitching.

13. The method of claim 10, wherein a portion of the first layer of material is cut to resemble stitching.

14. The method of claim 10 wherein the first layer of material is heat activated puff material.

15. The method of claim 14, wherein the extraction method is selected from the group consisting of blowing a compressed gas, mechanical picking, and gravity.

16. The method of claim 14, wherein a dotted line is printed onto the first layer of material to resemble stitching.

17. The method of claim 14, wherein a portion of the first layer of material is cut to resemble stitching.

18. The method of claim 14, further comprising the step of: heating the appliqué to cause the puff material to expand.

19. The process of claim 10, wherein a plurality of customers each designate a design and the operation of the process to generate the designs of the plurality of customers is continuous.

20. The process of claim 18, wherein a plurality of customers each designate a design and the operation of the process to generate the designs of the plurality of customers is continuous.

* * * * *